(12) United States Patent
Manwaring et al.

(10) Patent No.: US 7,093,855 B2
(45) Date of Patent: Aug. 22, 2006

(54) STEERING COLUMN ASSEMBLY HAVING CLAMPING MECHANISM

(75) Inventors: Marvin V. Manwaring, Saginaw, MI (US); Ravindra Jwalapathy, Saginaw, MI (US); Lee M. Tinnin, Clio, MI (US); Ray G. Armstrong, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 272 days.

(21) Appl. No.: 10/729,240

(22) Filed: Dec. 5, 2003

(65) Prior Publication Data

US 2005/0121895 A1 Jun. 9, 2005

(51) Int. Cl.
*B62D 1/18* (2006.01)
(52) U.S. Cl. .................................. 280/775; 74/493
(58) Field of Classification Search ............... 280/775; 74/493
See application file for complete search history.

(56) References Cited

U.S. PATENT DOCUMENTS

| | | | | | |
|---|---|---|---|---|---|
| 1,281,000 | A | * | 10/1918 | Hayter | 411/340 |
| 4,541,298 | A | * | 9/1985 | Strutt | 74/493 |
| 5,117,707 | A | * | 6/1992 | Kinoshita et al. | 74/493 |
| 5,160,165 | A | * | 11/1992 | Hoblingre | 280/775 |
| 5,165,720 | A | * | 11/1992 | Hoblingre | 280/775 |
| 5,213,004 | A | | 5/1993 | Hoblingre | |
| 5,377,555 | A | * | 1/1995 | Hancock | 74/493 |
| 6,276,719 | B1 | * | 8/2001 | Gartner | 280/775 |
| 2002/0023515 | A1 | * | 2/2002 | Kuroumaru et al. | 74/493 |
| 2004/0155448 | A1 | * | 8/2004 | Klukowski et al. | 280/777 |

FOREIGN PATENT DOCUMENTS

| | | |
|---|---|---|
| EP | 0443881 | 8/1991 |
| EP | 0600700 | 6/1994 |
| EP | 1433687 | 6/2004 |
| FR | 2787842 A1 * | 6/2000 |

\* cited by examiner

*Primary Examiner*—David R. Dunn
*Assistant Examiner*—Barry Gooden, Jr.
(74) *Attorney, Agent, or Firm*—Michael D. Smith

(57) ABSTRACT

A steering column assembly includes a compression bracket for attachment to a vehicle body, and an adjustable steering column assembly movably supported by the compression bracket along a longitudinal axis between adjusted positions. A pair of locking elements are operably connected to the compression bracket and movable between a locked position for preventing longitudinal movement therebetween and a release position for allowing longitudinal adjustment of the steering column. The first element presents a detent recess, and the second locking element is movable between the locked position engaging the detent recess and the release position out of engagement with the detent recess.

8 Claims, 5 Drawing Sheets

STEERING COLUMN ASSEMBLY HAVING CLAMPING MECHANISM

BACKGROUND OF THE INVENTION

1. Field of the Invention

The subject invention relates to an adjustable steering column for a vehicle and having telescoping components to adjust a height position of a steering wheel to accommodate the position of a driver.

2. Description of the Prior Art

Contemporary automobiles include a steering column to adjust a height position of a steering wheel connected to the vehicle steering column to accommodate the position of a driver. A typical telescoping steering column assembly includes one bracket fixed to the frame of a vehicle and another bracket in telescoping relationship with the first bracket to provide relative longitudinal movement between the two brackets. These brackets, engaged one within another in a telescoping fashion, allow the driver to push or pull the steering wheel to a desired position and then to lock the brackets in the telescoping column against telescoping movement relative to one another.

The art is replete with various designs of steering column assemblies with locking devices for releasably adjusting and securing the telescoping steering column to accommodate the position of a driver. The U.S. Pat. No. 6,276,719 to Gartner; the French Patent No. FR 2787842 to Chartrain et al.; and the European Patent No. EP 0443881 to Kinoshita disclose various designs of a clamping and locking device for a steering column assembly utilized to releasably adjust and secure the steering column to accommodate the position of a driver.

The U.S. Pat. No. 6,276,719 to Gartner teaches a locking device for releasably securing an adjustable steering column to a motor-vehicle body. The locking device comprises two locking elements where one of the two locking elements is attached to the steering column and the other is attached the motor-vehicle body. The two locking elements are adjustable in relation to each other between a release position, which allows the steering column to be adjusted, and a locking position, which secures the steering column against adjustment. One of the two locking elements is designed as an elastically ductile deformation element that can be deformed in the locking position by means of the other locking element.

The French patent No. FR 2787842 to Chartrain et al. teaches a vehicle steering column clamp moved to a clamping position by a cam rotatable about an axis extending through the clamp. The European Patent No. EP 0443881 to Kinoshita teaches a tilting steering column employing a caming device with a resilient member between two cam members. A tilt lever is mounted on the bolt to operate the first and second cam members to retain and release the frictional clamping engagement. The resilient member is provided between the first and second cam members to provide a positive lock during steering column tilting operation.

There remains a constant need in improving steering column assembly design that includes a clamping mechanism for releasably adjusting and securing the steering column assembly and to provide a positive lock.

BRIEF SUMMARY OF INVENTION

A steering column assembly of the present invention includes a compression bracket for attachment to a vehicle body. An adjustable steering column assembly is movably supported by the compression bracket for longitudinal adjustment along a longitudinal axis between adjusted positions. A pair of locking elements are operably connected to the compression bracket and movable between a locked position for preventing longitudinal movement of the adjustable steering column assembly relative to the compression bracket and a release position for allowing longitudinal movement of the adjustable steering column assembly along the longitudinal axis. The first element of the steering column assembly presents a detent recess. The second element of the steering column assembly is movable between the locked position engaging the detent recess and the release position out of engagement with the detent recess. The compression bracket includes bracket sections disposed on opposite sides of the adjustable steering column assembly. The locking elements interconnect the bracket sections for moving the bracket sections into clampming engagement with the adjustable steering column assembly for preventing relative longitudinal movement therebetween.

An advantage of the present design is to provide a steering column assembly that includes a clamping mechanism for releasably adjusting and locking brackets of the steering column assembly one with the other to accommodate the position of the driver and to provide a positive lock between the brackets.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
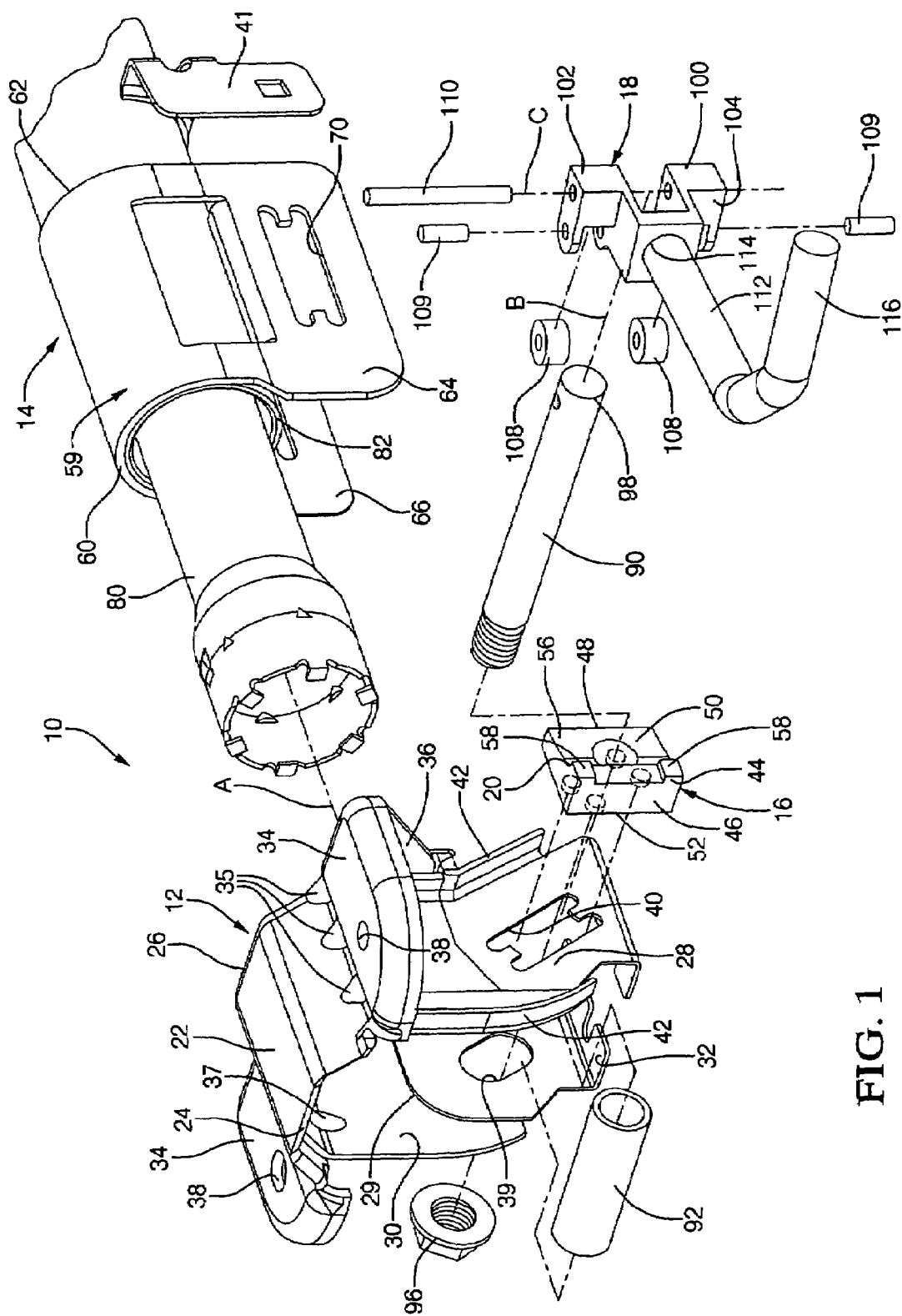
FIG. 1 is an exploded perspective view of a steering column assembly having a clamping mechanism including a bracket device having rollers connected thereto and rotatably engaged within a wedge defining a detent recess.

Referring to the FIGS. 1 through 6, wherein like numerals indicate parts throughout the several views, a steering column assembly of the present invention is generally shown at 10.

The steering column assembly 10 of the present invention includes a compression bracket, generally shown at 12, for attachment to a vehicle body. An adjustable steering column assembly, generally shown at 14, is movably supported by the compression bracket 12 for longitudinal adjustment along a longitudinal axis A for movement between adjusted positions. A pair of locking elements, generally indicated at 16, 18, respectively, are operably connected to the compression bracket 12 and movable between a locked position for preventing longitudinal movement of the adjustable steering column assembly 14 relative to the compression bracket 12 and a release position for allowing longitudinal movement of the adjustable steering column assembly 14 along the axis A.

The first element 16 of the steering column assembly 10 presents a detent recess 20. The second element 18 of the steering column assembly 10 is movable between the locked position engaging the detent recess 20 and the release position out of engagement with the detent recess 20.

Figure 3:
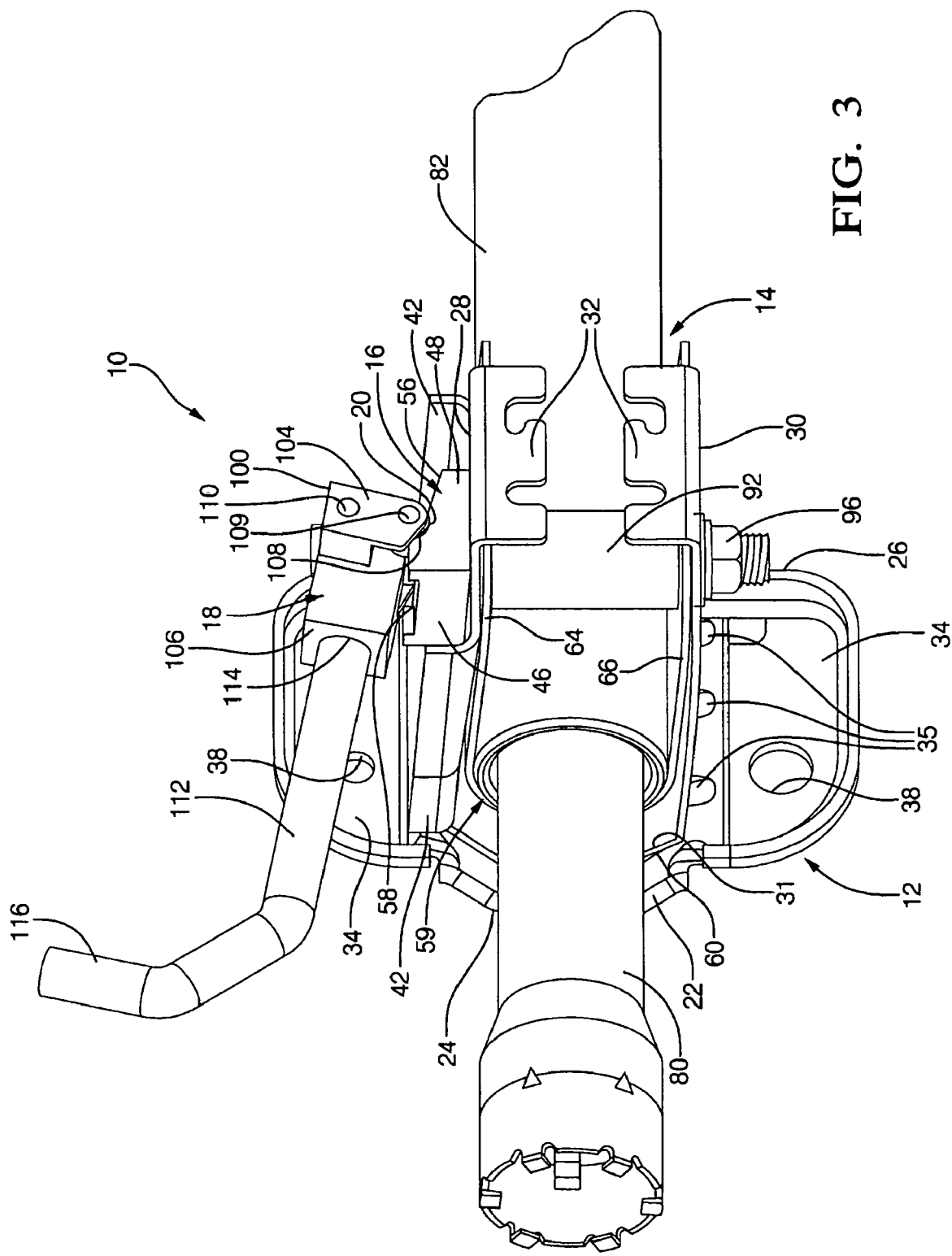
FIG. 3 is another perspective view of the bottom of the steering column assembly having the clamping mechanism.
Figure 4:
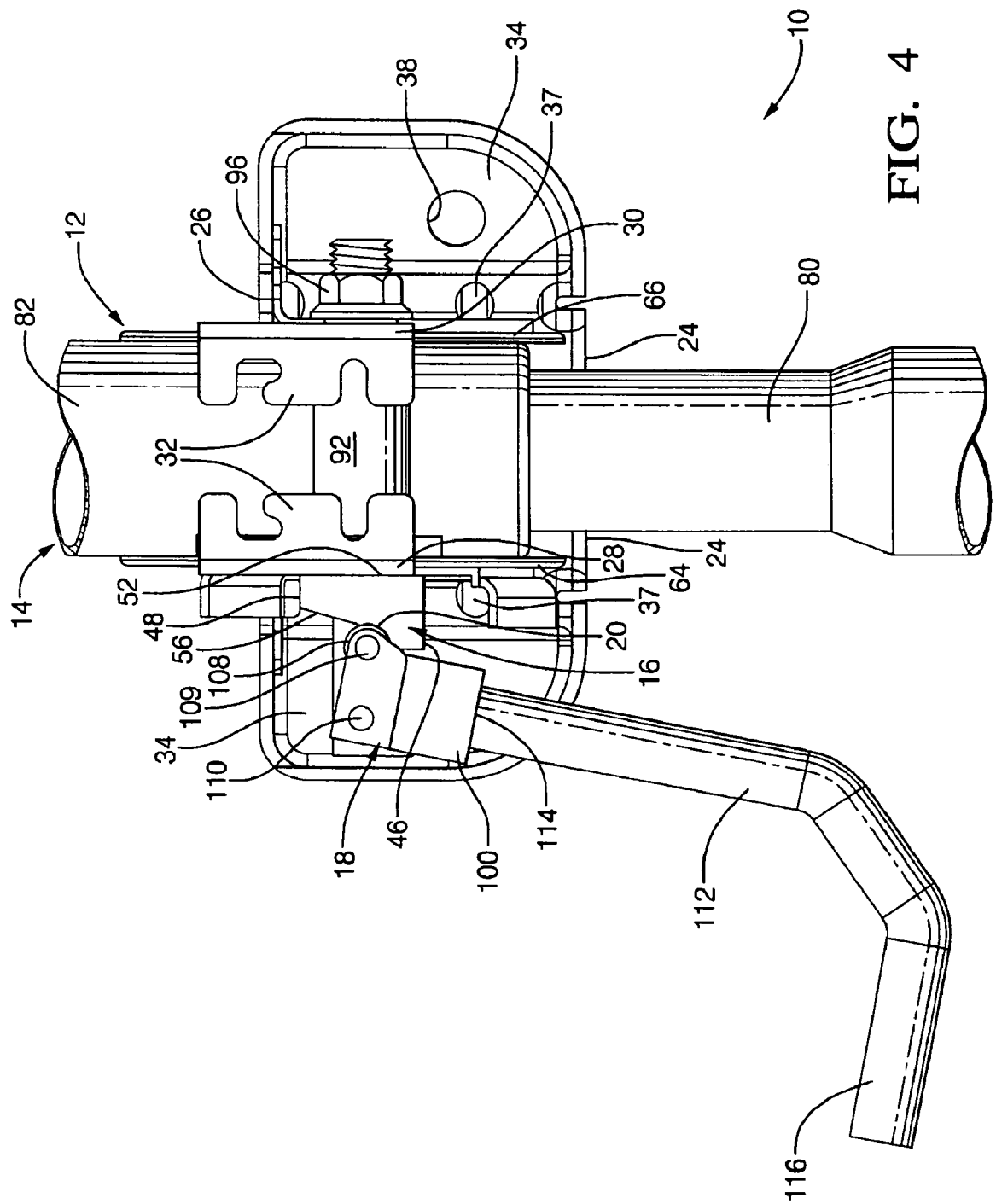
FIG. 4 is a bottom view of the steering column assembly having the clamping mechanism.

The compression bracket 12 includes a top wall 22 extending between first 24 and second 26 ends. The compression bracket 12 includes bracket sections 28, 30 interconnected by a wall 31, as shown in FIG. 3. The bracket sections 28, 30 are disposed on opposite sides of the column assembly 10. The bracket sections 28, 30 include an integral ridge 29 (only one is shown in FIG. 1) defined therein to divide the bracket sections 28, 30 into top and bottom portions, with the bottom portions being closer together than the top portions. The bracket sections 28, 30 include a bottom lip 32 that is integral with and extends inwardly from the lower extremity of each bracket section 28, 30 parallel to the top wall 22 and the wall 31, i.e., the lips 32 extend toward one another. The top wall 22 and the wall 31 are sandwiched one with the other and welded together.

A flange 34 that extends outwardly and horizontally from each side of the top wall 22. The compression bracket 12 includes a plurality of reinforcing ribs 35, integral with and extending between the top wall 22 and the flange 34. The compression bracket 12 also includes a plurality of reinforcing ribs 37, integral with and extending between the bracket sections 28, 30 and the wall 31. The compression bracket 12 includes a reinforcing web 36 integral with and extending between the top portion of the bracket sections 28, 30 and flange 34 at the second end 26 of the compression bracket 12. The flange 34 of the compression bracket 12 includes an aperture 38 for receiving a fastener (not shown) for connecting the compression bracket 12 to the body of the vehicle. The bracket sections 28, 30 further include holes 39, 40 extending therethrough. The compression bracket 12 includes a flange 42 extending outwardly from the bracket sections 28, 30 at the first 24 and second 26 ends. The compression bracket 12 includes a support member 41 spaced from the top wall 22 and is designed for attachment to the body of the vehicle for supporting the adjustable steering column 14. The compression bracket 12 and the support member 41 are formed from a polymer by extruding the polymer through injection molding. The compression bracket 12 and the support member 41 may be formed from a metal. Those skilled in the art will appreciate that the steering column assembly 10 of the present invention may include an alternative embodiment (not shown) wherein the flanges 34 are designed to adaptably engage a release mechanism for an energy absorption device (not shown) as described in the U.S. Pat. No. 6,419,269 to Manwaring et al.

Figure 2:
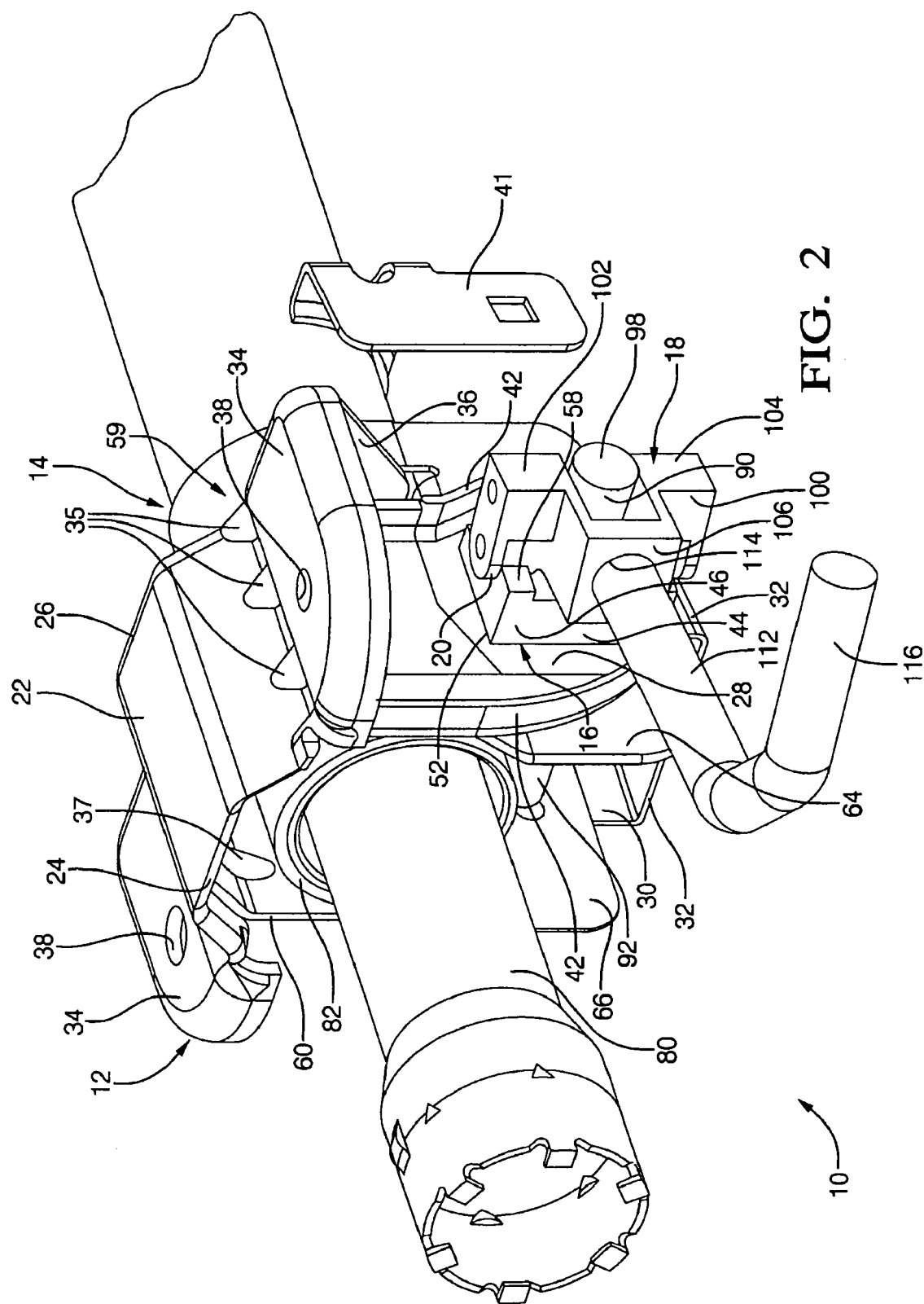
FIG. 2 is a perspective view of the top of the steering column assembly having the clamping mechanism.

As best shown in FIGS. 1 and 2, the first locking element 16 is defined by a wedge, generally indicated at 44. The wedge 44 includes front 46 and rear 48 ends, first 50 and second 52 side surfaces. The wedge 44 is connected to the bracket section 28 of the compression bracket 12 at the first side surface 52 of the wedge 44. The second side surface 50 of the wedge 44 is sloping with respect to the longitudinal axis A defining an acute angle therebetween. The wedge 44 includes an inclined ramp 56 sloping from the rear end 48 and further extends downwardly and then upwardly to define the detent recess 20 and then extends to the front end 46 to define a wall 58 extending in parallel relationship with respect to the longitudinal axis A.

Referring back to FIGS. 1 through 3, the adjustable steering column assembly 14 includes a support bracket, generally indicated at 59. The support bracket 59 has first 60 and second 62 ends, and side walls 64, 66, parallel one the other and interconnected by a top wall 68. The support bracket 59 further includes an elongated slot 70 extending longitudinally of the first end 60 and to the second end 62 of the support bracket 59. Similar to the compression bracket 12, the support bracket 59 is formed of a polymer. In another embodiment, the support bracket 59 is formed from a metal.

The adjustable steering column assembly 14 includes inner 80 and outer 82 tubular members disposed one within the other in a telescoping fashion. The outer tubular member 82 of the adjustable steering column assembly 14 is disposed within and connected to the support bracket 59. The inner tubular member 80 of the adjustable steering column assembly 14 is connected to the outer tubular member 82 by a pair of extruded bushings (not shown) sandwiched therebetween. Hence, the number, shape, and material of the bushings used to connect the inner 80 and outer 82 tubular members is not intended to limit the present invention. When the steering column 10 moves into dash board (not shown) during the crash, the extruded bushings are ruptured, thereby releasing the inner 80 and outer 82 tubular members from locking engagement to allow the inner 80 and outer 82 tubular members to collapse telescopingly in response to the crash condition. Similar to the support bracket 59 and the compression bracket 12, the inner 80 and outer 82 tubular members are formed from a metal or may be extruded from a polymeric material.

Figure 5:
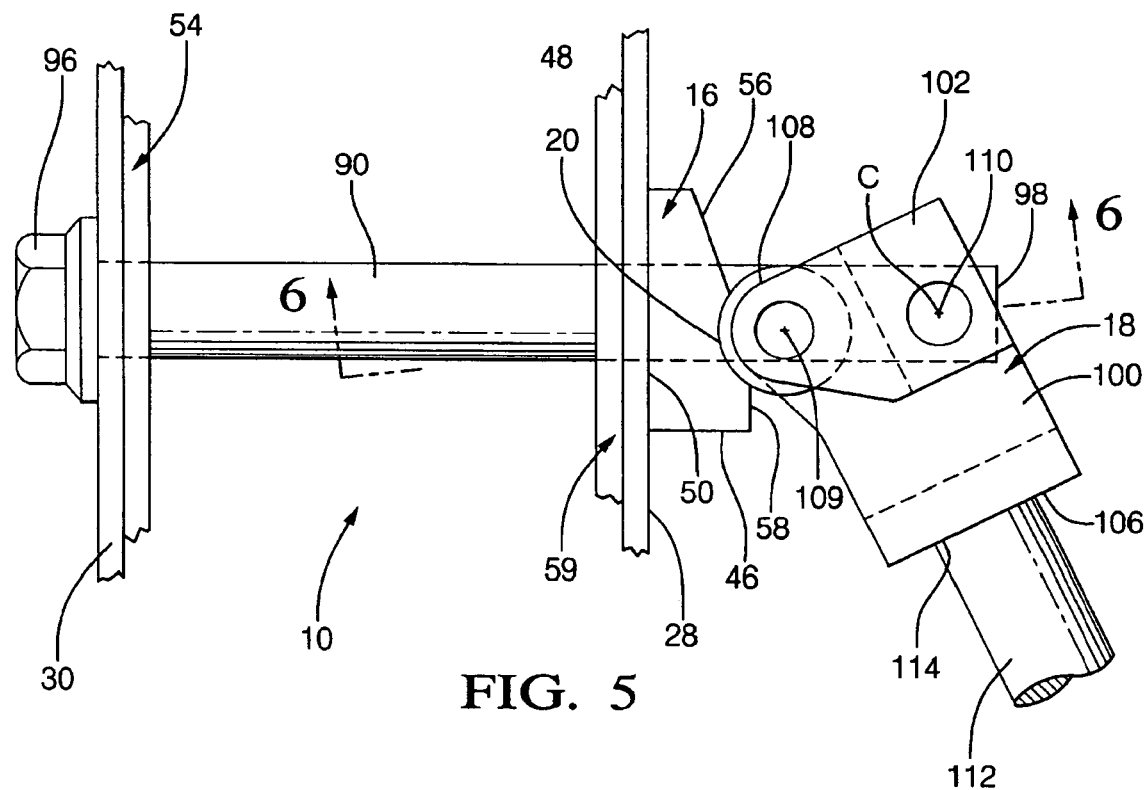
FIG. 5 is a fragmental view of the bracket device having the rollers connected thereto and rotatably engaged within the detent recess defined in the wedge.
Figure 6:
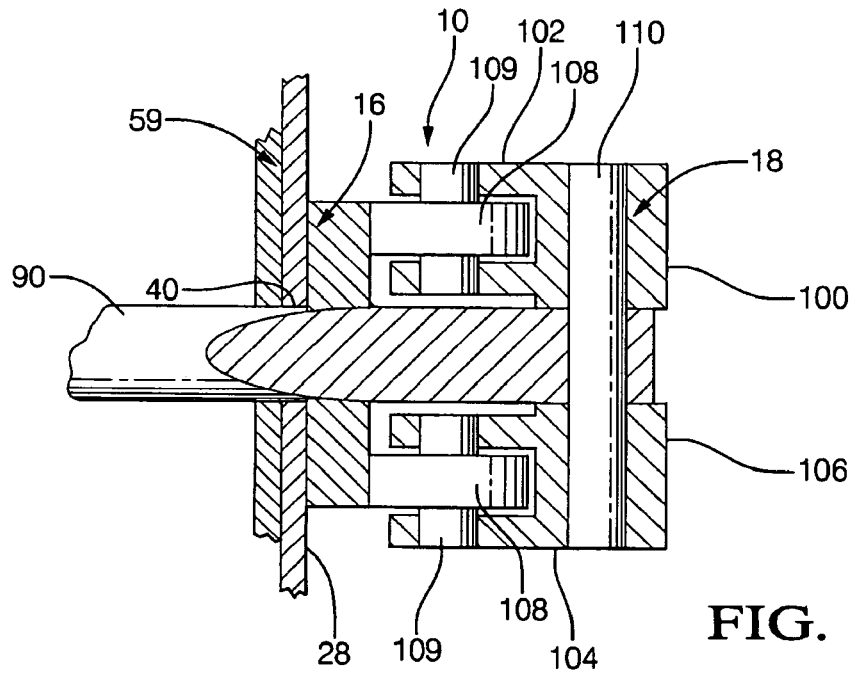
FIG. 6 is a cross sectional view of the bracket device engaged with the wedge shown in FIG. 5.

As best shown in FIGS. 1 and 5, a shaft, i.e. compression shaft 90, extends along an axis B transversely with respect to the longitudinal axis A and through the holes 39, 40 of the compression bracket 12 and further through the elongated slot 70 of the support bracket 59 and through the wedge 44 connected to the bracket section 28 of the compression bracket 12. The compression shaft 90 includes a tubular bushing 92 disposed about the compression shaft 90 and between the side walls 64, 66 of the support bracket 59 to hold the side walls 64, 66 in a fixed position and prevent the side walls 64, 66 from bending. The terminal end 94 of the compression shaft 90 is secureably connected within the bracket section 30 of the compression bracket 12 by a nut 96. The other terminal end 98 extends freely beyond the bracket section 28 of the compression bracket 12 and the wedge 44 and is not connected therewithin.

The steering column assembly 10 includes a bracket device, i.e. carriage 100. The bracket device 100 includes a generally tubular configuration and is disposed about the terminal end 98 of the compression shaft 90. The bracket device 100 has sides 102, 104 interconnected by a top wall 106. The bracket device 100 includes a roller 108 rotatably connected to each side 102, 104 of the bracket device 100. The bracket device 100 includes a roller pins 109 extending through each roller 108 and the sides 102, 104 to facilitate the rotational movement of the rollers 108 about the roller pins 109. The bracket device 100 includes a pin 110 extending through the bracket device 100 and the compression shaft 90 along a detent axis C extending vertically with respect to the longitudinal axis A to pivotably rotate the bracket device 100 about the compression shaft 90.

The steering column assembly 10 includes a lever 112 attached to and extending from the top wall 106 of the bracket device 100. The release lever 112 includes a shoulder 114 at one terminal end and a gripper 116 at another terminal end. The shoulder 114 is connected to the bracket device 100. The steering column assembly 10 includes an alternative embodiment, wherein the lever 112 is actuated electrically by means of a solenoid (not shown), or the like.

In operation, as the lever 112 is pivotably rotated about the detent axis C to the longitudinal axis A. The rollers 108 are rotated about the roller pins 109 engaged in the bracket device 100. The rollers 108 roll over the inclined ramp 56 into the detent recess 20 to lock within the detent recess 20, whereby the first 16 and second 18 locking elements interconnect and move the bracket sections 28, 30 into clamping engagement with the adjustable steering column assembly 14 for preventing relative longitudinal movement between the compression bracket 12 and the support bracket 59. When the lever 112 is pivotably rotated away from the longitudinal axis A, the rollers 108 are forced out of the detent recess 20 to allow relative longitudinal movement between the support bracket 12 and the support bracket 59, with respect to one another to adjust a height position of a steering wheel (not shown) connected to the telescoping steering column assembly 10 to accommodate the position of a driver.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly comprising:
    a compression bracket for attachment to a vehicle body with said compression bracket having bracket sections;
    an adjustable steering column assembly movably supported by said compression bracket for longitudinal adjustment along a longitudinal axis between adjusted positions with said bracket sections disposed on opposite sides of said adjustable steering column assembly;
    a pair of locking elements operably connected to said compression bracket and movable between a locked position for preventing longitudinal movement of said adjustable steering column assembly relative to said compression bracket and a release position for allowing longitudinal movement of said adjustable steering column assembly along said longitudinal axis;
    said first and second locking elements interconnecting said bracket sections for moving said bracket sections into clamping engagement with said adjustable steering column assembly for preventing relative longitudinal movement therebetween;
    a shaft extending through said bracket sections of said compression bracket; and
    said first locking element presenting a detent recess and said second locking element being movable between said locked position in engagement with said detent recess and said release position out of engagement with said detent recess with said second locking element rotatable about an axia offset from said second locking element and extending vertically with respect to said longitudinal axis and pivotal about said shaft with said second locking element moving into said detent recess to lock within said detent recess as said first and second locking elements move said bracket sections into said clamping engagement with said adjustable steering column assembly.

2. A steering column assembly as set forth in claim 1 wherein said first locking element includes an inclined ramp extending from said detent recess to facilitate movement of said second locking element into said detent recess.

3. A steering column assembly as set forth in claim 2 wherein said second locking element includes a bracket device and a roller rotatebly connected to said bracket device for rolling over said inclined ramp into and out of said detent recess.

4. A steering column assembly as set forth in claim 3 wherein said bracket device is pivotably connected to said shaft about said detent axis for moving said roller in an arcuate path.

5. A steering column assembly as set forth in claim 4 including a pin extending through said bracket device and said shaft for pivotally connecting said bracket device to said shaft and for defining said detent axis.

6. A steering column assembly as set forth in claim 5 wherein said bracket device includes sides interconnected by a top wall.

7. A steering column assembly as set forth in claim 6 wherein each side of said bracket device includes one of said rollers rotatebly connected thereto for rolling over said inclined ramp into and out of said detent recess.

8. A steering column assembly as set forth in claim 7 comprising:
    said compression bracket including top wall interconnecting said bracket sections extending parallel one the other, and first and second ends;
    said bracket sections including a bottom lip integral with and extending from said bracket sections parallel to said top wall;
    a flange integral with and extending outwardly from a lower end of each of said bracket sections in a cantilevered fashion;
    said first locking element defined by a wedge having front and rear ends and first and second side surfaces, said wedge being connected to said bracket section of said compression bracket;
    said inclined ramp of said wedge sloping from said rear end and further extending downwardly and then upwardly to define said detent recess and then extending to said front end to define a wall extending in parallel relationship with respect to said longitudinal axis;
    said bracket device including a roller pin extending through each roller and said sides to facilitate the rotational movement of said rollers about said roller pins;
    said adjustable steering column assembly including a support bracket having first and second ends, top wall and side walls parallel one the other and extending from said top wall;
    said side walls of said support bracket including an elongated slot extending longitudinally of said first end and said second end of the support bracket;
    an outer tubular member of said adjustable steering column assembly disposed within and connected to said support bracket;
    an inner tubular member of said adjustable steering column assembly disposed within and connected to said outer tubular member;

said shaft having terminal ends and extending along an axis transversely with respect to said longitudinal axis and through a hole defined in said compression bracket and said elongated slot of said support bracket and through said wedge connected to said bracket section of said compression bracket, one of said terminal ends of said shaft being securably connected with said side wall of said compression bracket and the other terminal end extending beyond the bracket section;

a bushing disposed about said shaft and between said side walls of said support bracket for preventing movement of said side walls with respect to said longitudinal axis; and a lever attached to and extending from said top wall of said bracket device for rotating said bracket device about a detent axis for detently sliding said rollers on said inclined ramp and locking said rollers within said detent recess.

* * * * *